United States Patent
Matthews et al.

(10) Patent No.: US 7,620,494 B1
(45) Date of Patent: Nov. 17, 2009

(54) USING ROUTING SYMBOLS TO DESCRIBE A DRIVING MANEUVER

(75) Inventors: Marshall B. Matthews, Mountville, PA (US); G. Duane Gearhart, Hummelstown, PA (US); Michael David Schmitz, Denver, CO (US)

(73) Assignee: MapQuest, Inc., Denver, CO (US)

(*) Notice: Subject to any disclaimer, the term of this patent is extended or adjusted under 35 U.S.C. 154(b) by 476 days.

(21) Appl. No.: 11/278,077

(22) Filed: Mar. 30, 2006
(Under 37 CFR 1.47)

Related U.S. Application Data

(63) Continuation-in-part of application No. 10/620,378, filed on Jul. 17, 2003, now Pat. No. 7,076,363.

(60) Provisional application No. 60/668,996, filed on Apr. 7, 2005.

(51) Int. Cl.
*G01C 21/34* (2006.01)

(52) U.S. Cl. .................... 701/211; 340/995.19

(58) Field of Classification Search ........... 701/211, 701/200, 202, 208, 209; 340/995.19, 995.24, 340/990, 995.27, 988, 995.1; 73/178 R
See application file for complete search history.

(56) References Cited

U.S. PATENT DOCUMENTS

| | | | |
|---|---|---|---|
| 4,914,605 A | 4/1990 | Loughmiller, Jr. | |
| 5,465,089 A | 11/1995 | Nakatani | |
| 5,504,482 A | 4/1996 | Schreder | |
| 5,648,768 A | 7/1997 | Bouve | |
| 5,752,217 A | 5/1998 | Ishizaki | |
| 6,184,823 B1 | 2/2001 | Smith et al. ............ | 342/357.13 |
| 6,256,580 B1 | 7/2001 | Mels | |
| 6,282,489 B1 | 8/2001 | Bellesfield | |
| 6,324,472 B1 | 11/2001 | O'Shea ................... | 701/211 |
| 6,338,021 B1 | 1/2002 | Yagyu | |
| 6,349,261 B1 | 2/2002 | Ohnishi | |
| 6,351,707 B1 | 2/2002 | Ichikawa | |
| 6,356,911 B1 | 3/2002 | Shibuya | |
| 6,434,482 B1 | 8/2002 | Oshida | |
| 6,477,460 B2 | 11/2002 | Kepler | |

(Continued)

FOREIGN PATENT DOCUMENTS

WO    WO 00/22593    4/2000

OTHER PUBLICATIONS

"Yahoo! Maps—Directions to LGA, New York, NY," reprinted from http://maps.yahoo.com on Jul. 15, 2003, 3 pages.

(Continued)

*Primary Examiner*—Dalena Tran
(74) *Attorney, Agent, or Firm*—Fish & Richardson P.C.

(57) ABSTRACT

Driving directions are presented where a maneuver in the driving directions includes a road symbol and an action symbol. A road symbol identifies the road involved in the particular maneuver, and an action symbol identifies an action to be performed to execute the particular maneuver. In one example, a road symbol, an action symbol and narrative text may be presented in displayed or printed driving directions. In another example, a road symbol and an action symbol may be used to describe a maneuver presented by an on-board or mobile navigation system when the vehicle in which the navigation system is present approaches the point at which the maneuver is to be taken. The road symbol and the action symbol may be presented with, or without, narrative driving directions.

33 Claims, 7 Drawing Sheets

U.S. PATENT DOCUMENTS

| | | |
|---|---|---|
| 6,498,982 B2 | 12/2002 | Bellesfield |
| 6,665,610 B1 | 12/2003 | Correia et al. .............. 701/209 |
| 6,826,472 B1 | 11/2004 | Kamei |
| 6,898,522 B2 | 5/2005 | Buth |
| 6,917,878 B2 | 7/2005 | Pechatnikov et al. ........ 701/210 |
| 7,133,771 B1 * | 11/2006 | Nesbitt ....................... 701/202 |
| 7,321,824 B1 * | 1/2008 | Nesbitt ....................... 701/201 |
| 2001/0056325 A1 | 12/2001 | Pu |
| 2003/0156049 A1 | 8/2003 | Behr |

OTHER PUBLICATIONS

"Your Personal Itinerary," reprinted from http://www.freetrips.com on Jul. 15, 2003, 3 pages.

* cited by examiner

600

| ROUTE ID | LIST OF MANEUVER IDENTIFIERS |
|---|---|
| 400 | 410, 411, 412, 413, 414, 415, 416, 417, 418, 419, 420, 421, 422, 423, 424, 425, 426 |
| 10598 | 405, 406, 407, 408, 409, 411, 414, 415, 416 |

| Maneuver ID | Road Type | Road # | Road Name | Orientation | Turn Angle | Exit # | Narrative Text |
|---|---|---|---|---|---|---|---|
| 311234 | State Road | | Brass Mill Rd | North | Start | | Start out going NORTH on BRASS MILL RD toward MD-7/Philadelphia Rd. |
| 311235 | State Road | 7 | MD-7 S | South | Sharp Left | | Turn Left onto MD-7 S/ PHILADELPHIA RD |
| 311236 | State Road | 543 | MD-543 N | North | Sharp Right | | Turn RIGHT onto CRESWELL RD/MD-543 N |
| 311237 | Interstate | 95 | I-95 | South | Merge Left | | Merge onto I-95 S via the ramp on the LEFT (Portions Toll) |
| 311238 | Interstate | 495 | I-495 | West | Exit Right | 27 | Merge onto CAPITAL BELTWAY/I-495 W via Exit 27 toward Silver Spring |
| 311239 | Interstate | 95 | I-95 | South | Exit Right | 57A | Merge onto I-95 S via EXIT 57A toward Richmond |
| 311240 | Interstate | 295 | I-295 | South | Exit Left | 84A | Merge onto I-295 S via EXIT 84A on the LEFT toward Rocky MT, NC |
| 311241 | Interstate | 64 | I-64 | East | Exit Right | 28A | Merge onto I-64 E via EXIT 28A toward NORFOLK/VA BEACH |
| 311242 | (Interstate) | (264) | I-264 | (East) | Exit Right | 284A | Merge onto I-264 E via EXIT 284A toward VA Beach |

FIG. 7

USING ROUTING SYMBOLS TO DESCRIBE A DRIVING MANEUVER

CROSS REFERENCE TO RELATED APPLICATIONS

This application claims the benefit of U.S. Provisional Application No. 60/668,996, filed Apr. 7, 2005, and titled DUAL ROUTING SYMBOLS FOR A ROUTE MANEUVER, which is incorporated by reference in its entirety. This application is a continuation-in-part of U.S. application Ser. No. 10/620,378, filed Jul. 17, 2003, and titled USING ROUTE NARRATIVE SYMBOLS, which is incorporated by reference in its entirety.

TECHNICAL FIELD

This description relates to presenting driving directions for a travel route between an origin location and a destination location.

BACKGROUND

A travel route between an origin location and a destination location may be determined by a computer system, which may be referred to as a mapping system. A user of a mapping system may desire to see driving directions, such as a list of maneuvers in the travel route and a narrative description of each maneuver to be made. The driving directions may be difficult to comprehend, particularly while attempting to follow the driving directions and drive a vehicle at the same time. For example, it may be difficult to discern the next maneuver which must be taken while driving to a particular location, particularly where the maneuvers are not displayed in a clear and understandable fashion. An overview of the driving directions, such as the interstates and highways included in the travel route, also may be difficult to comprehend based on the narrative description of each maneuver when many maneuvers are included in a travel route. This may occur, for example, when a travel route covers many hundreds of miles and involves traveling on many different interstates and highways.

SUMMARY

In one general aspect, displaying driving directions includes accessing data that describes at least one maneuver to be executed to traverse a route from an origin to a destination and selecting a portion of the accessed data that describes a particular maneuver. A road symbol to be associated with the particular maneuver is determined, where the road symbol identifies the road involved in the particular maneuver. An action symbol to be associated with the particular maneuver is determined, where the action symbol identifying an action to be performed to execute the particular maneuver. Both the road symbol and the action symbol are presented to describe the particular maneuver.

Implementations may include one or more of the following features. For example, text may be presented, in addition to the road symbol and the action symbol, to describe the particular maneuver. In some implementations or for some maneuvers, only the road symbol and the action symbol may be presented to describe the particular maneuver. Both the road symbol and the action symbol may be presented while travel is occurring.

A navigation system capable of determining geographic location may be used to present the road symbol and the action symbol to describe the particular maneuver, or a communication device capable of transmitting and receiving voice communications may be used is used to present the road symbol and the action symbol to describe the particular maneuver.

The action symbol may indicate, for example, a turn direction, a turn angle, a merge or an exit involved in the particular maneuver. The road symbol may have substantially the same appearance as a road sign used to mark the road represented by the road symbol, may include a road number that identifies the road represented by the road symbol, or may include or be an interstate road symbol that has substantially the same appearance as an interstate sign used to mark the interstate represented by the interstate road symbol. The road symbol and the action symbol may be presented in positions that are adjacent to one another.

Implementations of any of the techniques described may include a method or process, an apparatus or system, or computer software on a computer-accessible medium. The details of one or more implementations are set forth in the accompanying drawings and the description below. Other features and advantages will be apparent from the description and drawings, and from the claims.

DESCRIPTION OF DRAWINGS

FIGS. 6 and 7 are diagrams depicting example data structures used to display a road symbol and an action symbol for a maneuver in driving directions from an origin location to a destination location.

Like reference symbols in the various drawings indicate like elements.

DETAILED DESCRIPTION

Figure 1A:
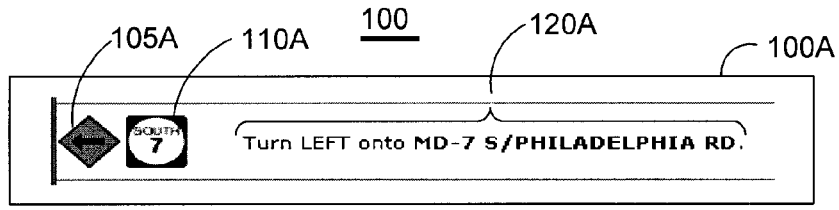
FIGS. 1A-1F are diagrams illustrating the display of symbols that describe a maneuver.

To help improve comprehensibility of driving directions, particularly when directions must be comprehended based merely on a quick glance, two routing symbols are provided for a maneuver included for driving directions provided by a mapping or navigation system. For example, two routing symbols and narrative text may be included for a maneuver in displayed or printed driving directions. In another example, two routing symbols may be used to describe a maneuver presented by an on-board or mobile navigation system when the vehicle in which the navigation system is present approaches the point at which the maneuver is to be taken. The multiple routing symbols may be presented with, or without, narrative driving directions. Examples of narrative driving directions include oral narrative instructions, displayed or printed narrative instructions, or a combination of oral, displayed and/or printed instructions. In one example of routing symbols, two routing symbols may be used to describe a merge onto an Interstate highway. The two routing symbols may be, for example, an Interstate routing shield identifying the Interstate number (and, perhaps, direction of travel) and an exit routing shield indicating an exit number. In another example, a turn onto a state road may be described using a turn routing symbol indicating the turn direction and a green or blue rectangle symbol depicting the name of the road (and reminiscent of a street sign). It may be useful to describe a maneuver using one routing symbol relating to a maneuver type or action to be taken (e.g., a turn type, a merge, or an exit) and a second routing symbol identifying the road (e.g., I-64 East and I-95 North) involved in the maneuver, where the first and second routing symbols are distinct symbols.

More particularly, driving directions may be represented by an ordered list of one or more maneuvers to be followed to travel from an origin location to a destination location. A road symbol and an action symbol are presented to describe a maneuver included in driving directions for a route to a destination. A road symbol for a particular driving maneuver may be used to represent the road to which the maneuver relates. For example, one type of road symbol that may be used to represent a road may be an interstate road symbol that has substantially the same appearance (e.g., substantially the same or similar shape, and/or substantially the same coloration) as an interstate route sign used to mark the interstate itself. Another example of a type of a road symbol that represents a road is a highway route symbol that has substantially the same appearance as a highway route sign used to mark a state highway. Yet another example of a type of a road symbol that represents a road is a state road symbol that looks substantially similar in appearance to a state road sign used to identify a state road.

An action symbol for a particular driving maneuver may be used to represent the action described by the maneuver, which also may be referred to as a maneuver type. Examples of an action described by a maneuver may include make a left turn, make a right turn, take an exit, merge, take a right fork, and continue straight, among others. An action symbol may represent a direction to turn, a merge to perform, an exit to take from a highway or interstate, or an indication to continue straight (such as to continue straight through an intersection of roads). An action symbol may be used to represent more particular actions, such as to make a sharp left turn, to make a sharp right turn, to make a slight left turn, to make a slight right turn, to merge left, or to merge right.

The display of a road symbol and an action symbol for a maneuver may provide a visual reference that is easier to comprehend than a corresponding narrative-only presentation of the driving directions. A driver may find it useful to be able to quickly comprehend the next maneuver while en route to a destination with only a quick glance at the driving directions. For example, an action symbol representing a right turn and a road symbol representing a particular state road may be used to communicate a maneuver to turn right onto the state road identified by the road symbol. Placing the road symbol and the action symbol adjacent to one another may be helpful for a user to comprehend the upcoming maneuver. Additionally, narrative text describing the maneuver may be presented.

The display of a road symbol and an action symbol to represent a maneuver may be particularly useful in the context of an on-board navigation system, a mobile navigation system, or when printed directions are used while driving. Generally, in such a context, a driver or other type of user has a limited amount of time to look at driving directions to understand an upcoming maneuver. The presentation of a road symbol and an action symbol to describe a maneuver may allow the driver to discern a maneuver to be taken in time to execute the maneuver. Presentation of a road symbol that has substantially the same appearance as the road sign used to mark the road (e.g., a road symbol representing an Interstate that bears a substantial similarity in shape and coloring to an Interstate route sign used to mark the interstate) may help to increase comprehension. In the same manner, the appearance of the action symbol that is substantially the same in appearance as a road sign with the same or similar meaning may help increase comprehension of the maneuver.

FIGS. 1A-1F illustrate displaying a road symbol and an action symbol to describe a maneuver to help a viewer comprehend the maneuver to be performed. FIG. 1A shows an example 100A of an action symbol 105A indicating a turn direction (i.e., a left turn), a road symbol 110A indicating a state road (i.e., South 7), and narrative text 120A describing the maneuver (i.e., Turn LEFT onto MD-7 S/Philadelphia RD). The road symbol 110A indicates the direction of travel on the road (i.e., South) and the route number (i.e., 7).

Figure 1B:
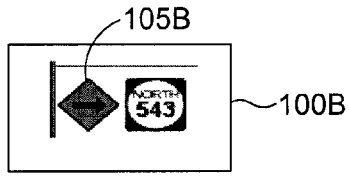

FIG. 1B shows an example 100B of an action symbol 105B indicating a turn direction (i.e., a right turn) and a road symbol 110B identifying a state road (i.e., North 543) involved in the maneuver to which the two route symbols 105B and 110B correspond. In contrast with the example 100A of FIG. 1A, the example 100B of FIG. 1B does not include narrative text for the driving maneuver. Displaying an action symbol and a road symbol without narrative text may be used, for example, when display space is limited, as in a mobile navigation system or an on-board navigation system.

Figure 1C:
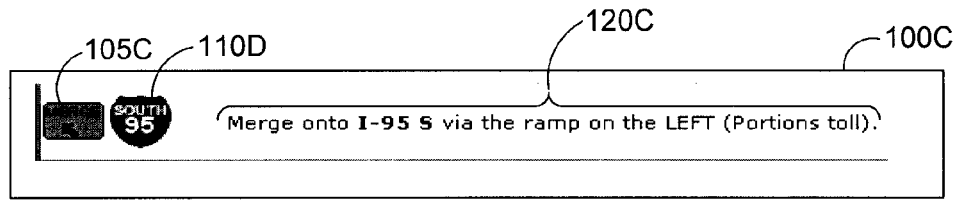

FIG. 1C shows another example 100C of an action symbol 105C indicating a merge (i.e., left merge), a road symbol 110C identifying the interstate (i.e., I-95 South) on which to merge, and narrative text 120C (i.e., Merge onto I-95 S via the ramp on the LEFT (Portions toll)) to describe a driving maneuver.

Figure 1D:
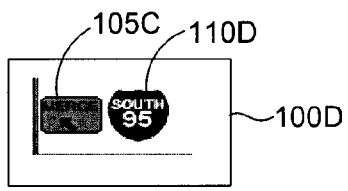

FIG. 1D shows an example 100D in which the action symbol 105C and the road symbol 110C (which are also both included in example 100C of FIG. 1C) are displayed without narrative text for the driving maneuver that corresponds to the action symbol 105C and the road symbol 110C.

Figure 1E:
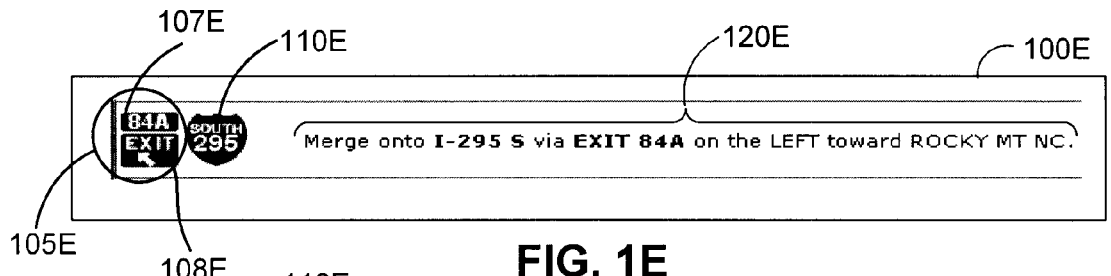

FIG. 1E shows yet another example 100E of an action symbol 105E indicating an exit to be taken (i.e., exit 84A) and a road symbol 110E identifying the interstate reached by the exit indicated in action symbol 105E (i.e., I-295 South), and narrative text 120E (Merge onto I-295 S via EXIT 84A on the LEFT toward ROCKY MY NC) to describe a driving maneuver. It is important to note that a route symbol may include other route symbols. For example, action symbol 105E includes a route symbol 107E identifying the number of the exit (i.e., 84A) and a route symbol 108E indicating that a left exit is to be taken.

Figure 1F:
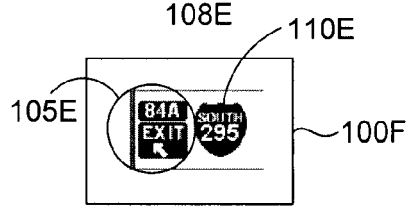

FIG. 1F shows an example 100F in which the action symbol 105E and the road symbol 110E are displayed for the same maneuver as illustrated in example 100E of FIG. 1E. In contrast with the example 100E of FIG. 1E, the example 100F does not include narrative text to describe the maneuver.

Figure 2:
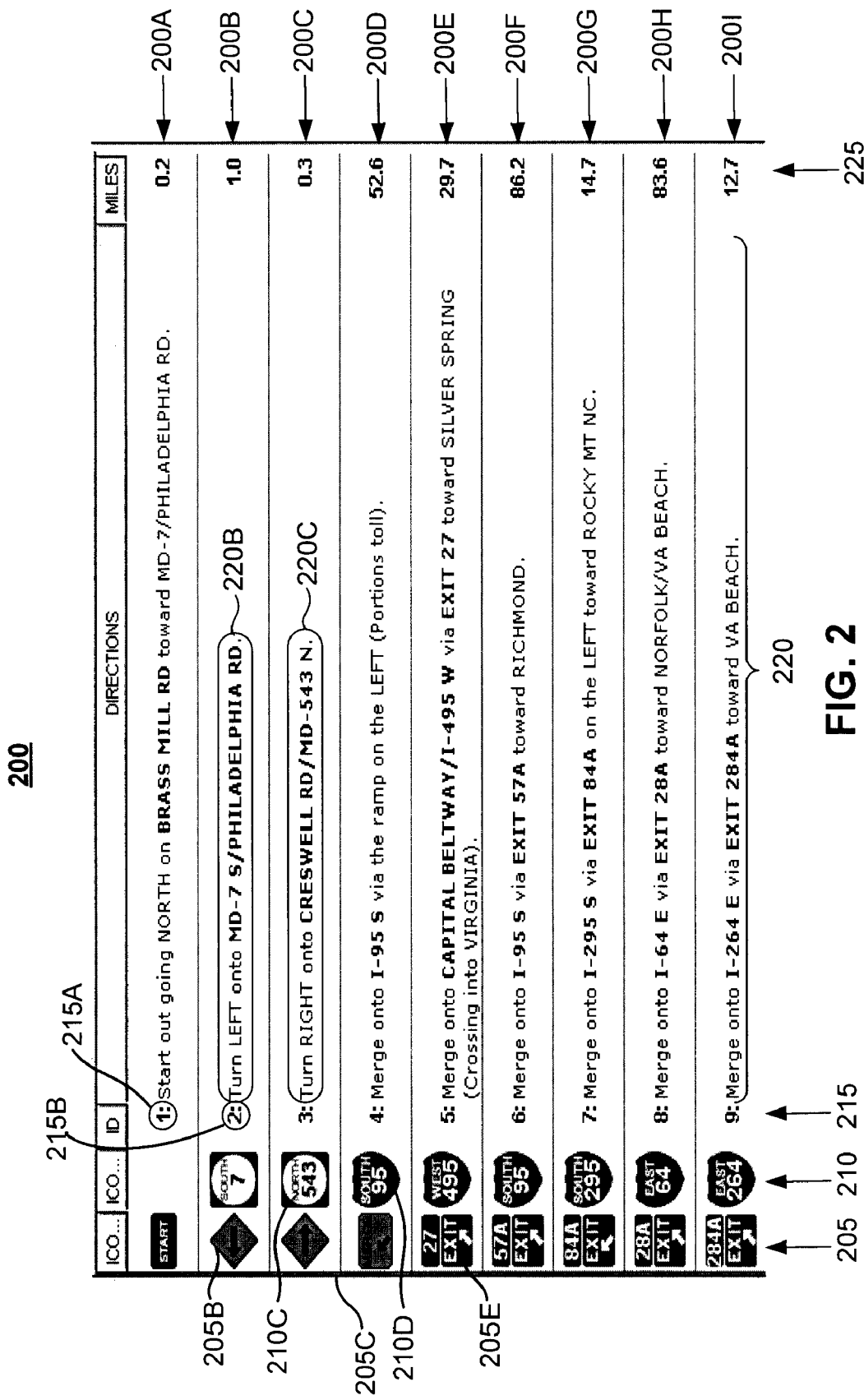
FIG. 2 is a diagram illustrating the display of driving directions from an origin location to a destination location.

FIG. 2 shows driving directions 200 from an origin location to a destination location. The driving directions 200 include maneuvers 200A-200I. A maneuver includes an action symbol 205 adjacent to a road symbol 210 to describe the maneuver. A maneuver also includes a sequence indicator 215 that indicates the order in which a maneuver is to be executed relative to the other maneuvers. For example, maneuver 200A includes a sequence indicator 215A of "1," and maneuver 200B includes a sequence indicator 215B of "2." The sequence indicators 215A and 215B indicate the order in which the maneuvers 200A and 200B are to be performed—that is, the maneuver 200A is to be executed first, the maneuver 200B is to be executed second and after maneuver 200A, and so on.

A maneuver also includes narrative text 220 that describes the maneuver to be performed. For example, maneuver 200B includes narrative text 220B (i.e., Turn LEFT onto MD-7 S/Philadelphia Rd.), and maneuver 200C includes narrative text 220C (i.e., Turn RIGHT onto CRESWELL RD/MD-543 N.).

Each of the maneuvers 200A-200I includes an action symbol 205 on the far left side of the maneuver, such as 205B (i.e., a left turn symbol), 205C (i.e., a right turn symbol), and 205E (i.e., an exit right symbol). In addition, most of the maneuvers 200A-200I include a road symbol 210 to the immediate right of the action symbol. Examples of road symbols 210 include 210C (i.e., a state highway symbol) and 210D (i.e., an interstate highway symbol). The maneuvers 200A-200I also include number 225 of miles to be traveled before the next maneuver is to be performed.

The symbols 205 and 210 may provide a quick reference to a person glancing at the driving directions 200 to help the person more easily discern the maneuvers or a particular maneuver to be performed. For example, considering maneuver 200C, the action symbol 205C representing a sharp right turn, in conjunction with the road symbol 210C representing state road North 543, may enable a viewer to understand that the maneuver 200C is to turn right onto North 543.

Figure 3:
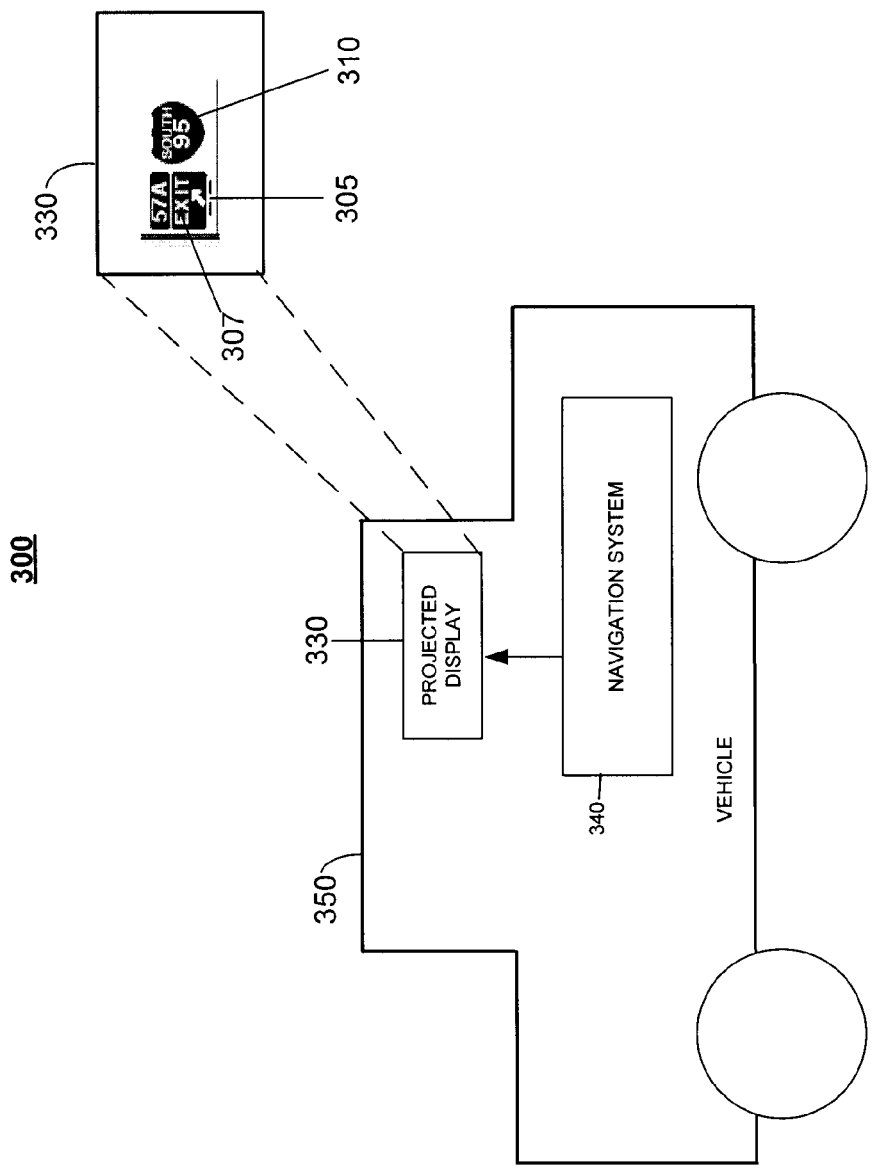
FIG. 3 is a diagram illustrating the display of an upcoming maneuver in an on-board navigation system.

FIG. 3 shows an example 300 presenting an action symbol 305 and a road symbol 310 in a heads-up display 330 in a vehicle 350. More particularly, a vehicle 350 includes an on-board navigation system 340 capable of producing a heads-up display 330, for example, by projecting a holographic image of the action symbol 305 and the road symbol 310. The display 330 presents the action symbol 305 and the road symbol 310, which together describe the next maneuver to be performed to traverse a travel route. In particular, the action symbol 305 and the road symbol 310 indicate that the driver of the vehicle 350 is to take Exit 57A (as indicated by action symbol 305) to merge onto South I-95 (as indicated by road symbol 310). The direction of the arrow 307 on the action symbol 305 indicates that the exit is located on the right side of the road being traveled.

Figure 4:
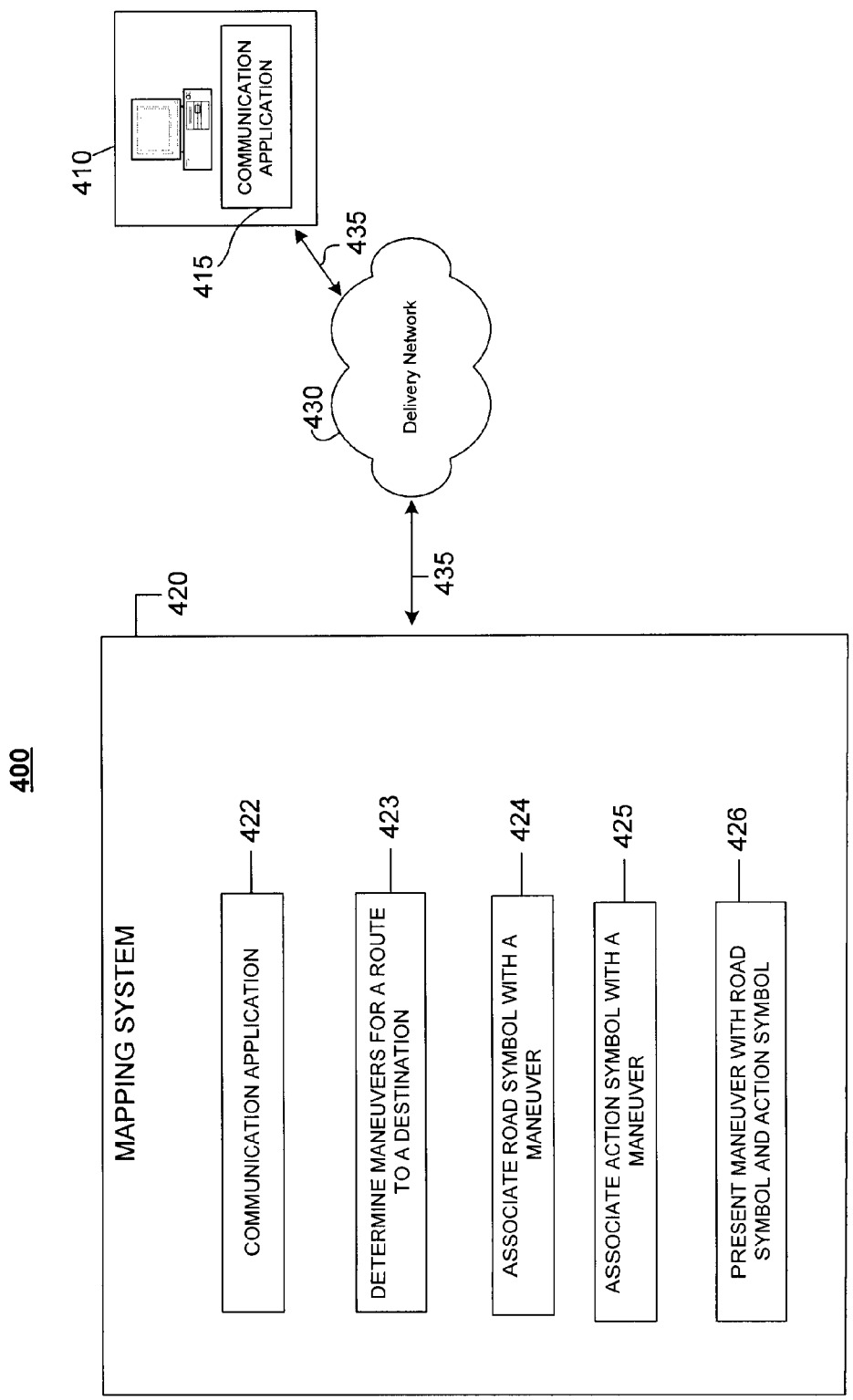
FIG. 4 is a block diagram of a communications system capable of displaying route narrative symbols for driving directions of a travel route.

FIG. 4 shows a communications system 400 capable of presenting a road symbol and an action symbol to describe a driving maneuver. More particularly, the communications system 400 is capable of delivering and exchanging messages between a client system 410 and a mapping system 420 through a delivery network 430 to present routing symbols for one or more driving maneuvers.

Each of the client system 410 and the mapping system 420 may be a general purpose computer (e.g., a personal computer, a desktop computer, or a laptop computer) capable of responding to and executing instructions in a defined manner. Other examples of the client system 410 and the mapping system 420 include a special purpose computer such as an on-board navigation system, a mobile navigation system, a workstation, a server, a device, a component, or other physical or virtual equipment or some combination thereof capable of responding to and executing instructions. The client system 410 also may be a personal digital assistant (PDA), a communications device, such as a mobile telephone or a portable electronic mail (e-mail) system, or a combination of a PDA and communications device.

The client system 410 includes a communication application 415 and is configured to use the communication application 415 to establish a session with the mapping system 420 over the delivery network 430. The communication application 415 may be, for example, a browser or another type of communication application that is capable of accessing the mapping system 420. The client system 410 is configured to send to the mapping system 420 requests for driving directions for a route identified by an origin location and a destination location. The client system 410 also is configured to receive driving directions from the mapping system 420 and to present the received driving directions to a user, where the driving directions include at least one maneuver that is described using an action symbol and a road symbol.

The delivery network 430 provides a direct or indirect communication link between the client system 410 and the mapping system 420, irrespective of physical separation. Examples of a delivery network 430 include the Internet, the World Wide Web, WANs, LANs, analog or digital wired and wireless telephone networks (e.g., PSTN ("Public Switched Telephone Network"), ISDN ("Integrated Services Digital Network"), and DSL ("Digital Subscriber Line") including various forms of DSL such as SDSL ("Single-line Digital Subscriber Line"), ADSL ("Asymmetric Digital Subscriber Loop"), HDSL ("High bit-rate Digital Subscriber Line"), and VDSL ("Very high bit-rate Digital Subscriber Line")), radio, television, cable, satellite, power lines and/or any other delivery mechanism for carrying data.

The delivery network 430 includes communication pathways 435 that enable the client system 410 and the mapping system 420 to communicate with the delivery network 430. Each of the communication pathways 435 may include, for example, a wired, wireless, virtual, cable, or satellite communications pathway.

The mapping system 420 may be a host system, such as an Internet service provider that provides a mapping service to subscribers. In another example, the mapping system 420 may be a system that hosts a web site that provides mapping services to the general public.

In general, the mapping system 420 is configured to provide driving directions for a route between an origin location and a destination location identified by a user, where the driving directions are provided as a series of one or more maneuvers and at least one maneuver is associated with an action symbol and a road symbol to describe the maneuver. The mapping system 420 may be a host system, such as an Internet service provider that provides a mapping service to subscribers. In another example, the mapping system 420 may be a system that hosts a web site that provides mapping services to the general public.

The mapping system 420 includes a communications application 422 that is configured to enable the mapping system 420 to communication with the client system 410 through the delivery network 430.

The mapping system 420 includes code segments 423 configured to determine maneuvers for a route to a destination. To do so, for example, the mapping system may receive a destination and an origin from the client system 410 over the delivery network 430 and determine a route between the origin and the destination. The mapping system may determine the route, for example, using route determination techniques to progressively search a network graph beginning from an origin until the destination is reached. In one example, the mapping system may use the Dijkstra or A* method to determine a desirable route based on the distance and/or time required to travel between the origin and the destination. The mapping system determines driving maneuvers to be performed for the determined route.

The mapping system 420 also includes code segments 424 that are configured to determine a road symbol for a maneuver, and code segments 425 that are configured to determine an action symbol for a maneuver, as described more fully later. Generally, the code segments 423, 424 and 425 are executed when the mapping system 420 is processing a request for driving directions from the client system 410.

The mapping system 420 also includes code segments 426 that are configured to present a road symbol and an action symbol to provide driving directions for a maneuver of a route.

In some implementations, the functions described as being performed by the mapping system 420 and the client system 410 may be included in a single device, such as an on-board navigation system, a mobile navigation system, a PDA, or communications device. For example, the mapping system 420 may be implemented as an on-board navigation system that is located in a vehicle and configured to provide driving directions based on the vehicle's current location. Additionally, an on-board navigation system also may be capable of communication with another system, such as, for example, with a host system to receive updated navigation data for use in determining a route or real-time routing information (such as information about traffic congestion).

Figure 5:
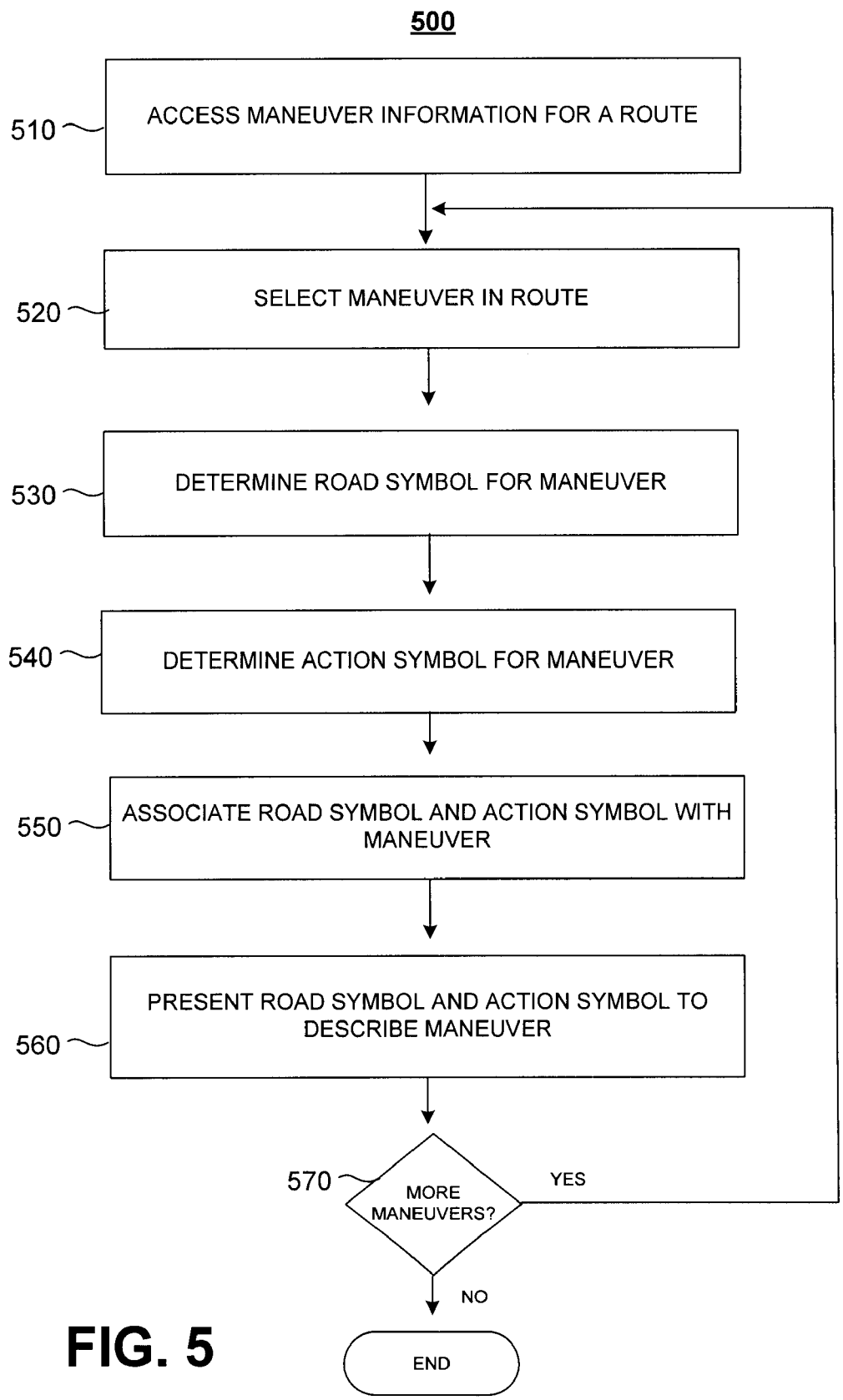
FIG. 5 is a flow chart illustrating a process for displaying driving directions in which each maneuver is displayed with an associated road symbol and an associated action symbol.

FIG. 5 shows a process 500 for displaying driving directions in which a road symbol and an action symbol are associated with a maneuver. The process 500 may be performed, for example, by a processor of a mapping system, such as mapping system 420 of FIG. 4, or a processor of an on-board or mobile navigation system. FIGS. 6 and 7 illustrate example data structures and data values that may be used with process 500 to display a road symbol and an action symbol for a driving maneuver.

The process 500 begins when the processor accesses maneuver information for a route (step 510). To do so, the processor may access a table, a list or another type of data structure that associates a list of maneuvers with a route identifier that identifies the particular travel route for which the driving directions are displayed.

FIG. 6 shows one example of a data structure for a list of maneuvers for a particular travel route. In general, each maneuver in the list of maneuvers is represented by a maneuver identifier, and the travel route is represented by a route identifier ("ID"). Maneuver information for each maneuver in the list of maneuvers is identified by a maneuver identifier. Maneuver information is associated with a particular route through the list of maneuvers for the particular route.

The route information 600 may be stored in a relational database system that logically organizes data into a database table. The database table arranges data associated with an entity (here, a travel route) in a series of columns 612 and 614 and rows 622 and 624. Each column 612 or 614 describes an attribute of the travel route for which data is being stored. Each row 622 or 624 represents a collection of attribute values for a particular travel route. The attribute 612 represents an identifier for the travel route represented by the row 622 or 624. The attribute 614 is a list of maneuver identifiers for maneuver information for a maneuver included in the route.

FIG. 7 shows one example of maneuver information 700 for a maneuver in a travel route. The maneuver information 700 may be stored in a relational database system that logically organizes data into a database table. The database table arranges data associated with a maneuver in a series of columns 710-717 and rows 720-728. Each column 710-717 represents an attribute of a maneuver, and each row 720-728 represents a collection of attribute values for a particular maneuver. The attributes are used to display driving directions, such as the maneuvers 200A-200I of the displayed driving directions 200 of FIG. 2.

The attribute 710 includes a maneuver ID to uniquely identify a maneuver in the attribute 710 of the maneuver information 700. The maneuver ID corresponds to a maneuver ID in the list of maneuver identifiers in attribute 614 for a particular route identified by the route ID 612 in the route information 610.

The maneuver information in data structure 700 also includes a road type 711, a road number 712, a road name 713, an orientation 714, a turn angle 715, an exit number 716, and narrative text 717. The road type 711 includes an indication of the type of road involved in the maneuver, which often is the road to which a maneuver is made. Examples of indicators of the type of road include whether the road is a state road, a state highway, or an interstate. The road number 712 identifies the particular road number of the road involved in the maneuver. Together, the road type and road number identify a particular road involved in the maneuver. For example, the particular road I-264 is identified using a road type 711A of "INTERSTATE" and a road number 712A of "264." The road name 713 is an optional attribute that identifies a name for a road. The orientation 714 identifies the orientation, such as a travel direction (e.g., North, West, South, and East), involved in the maneuver. A particular orientation 714A for a maneuver used with the road type and road number of the maneuver indicates the travel direction of the road (e.g., I-264 EAST). The road type 711, the road number 712 and, optionally, the orientation 714 may be used by the processor to generate a road route symbol for the maneuver in driving directions for a travel route that includes the maneuver.

The turn angle 715 includes an indication of the degree of angle involved in a turn of the maneuver. The turn angle 715, for example, may be one of a sharp left, a sharp right, a slight left, a slight right, a merge direction, or an exit direction. The turn angle 715 may be used by the processor to generate an action symbol that identifies a turn direction for a maneuver in driving directions for a travel route that includes the maneuver.

The exit number 716 indicates an exit number associated with an exit identified in the maneuver. The exit number is an optional attribute. Some implementations may determine the exit number for a maneuver from narrative text 717.

The narrative text 717 includes the textual description for the maneuver that may be displayed in the driving directions for a travel route that includes the maneuver. Some maneuvers in the maneuver information 700 include only narrative text and not values for each of the road type 711, the road number 712, the orientation 714 and the turn angle 715.

Referring again to FIG. 5, the processor then selects a maneuver in the travel route (step 520). For example, the processor may access the first maneuver in the list of maneuvers 614 of FIG. 6.

The processor determines a road symbol to describe the maneuver (step 530). For example, a road symbol may be associated with a maneuver in a maneuver data structure, such as the maneuver data structure 700 of FIG. 7. Alternatively or additionally, the processor may access road symbol information stored in a table, a list, or another type of data structure. In one example, road symbol information may be stored in a database table that associates a road symbol with a road type 711—an interstate road symbol may be associated with road type having a value of interstate, a highway road symbol may be associated with road type having a value of highway, a state road symbol may be associated with road type having a value of state, and a local road symbol may be associated with road type having a value of local. In some implementations, a table or other type of data structure may be unnecessary, such as where the road symbol is identified by the same name as the road type (e.g., interstate, highway, state or local).

The processor determines an action symbol to describe the maneuver (step 540). For example, an action symbol may be associated with a maneuver in a maneuver data structure, such as the maneuver data structure 700 of FIG. 7. Alternatively or additionally, the processor may access action symbol information stored in a table, a list, or another type of data structure. For example, a turn angle may be associated with an action symbol type to identify an action symbol to be used for a particular turn angle. The processor may identify an action symbol type based on the turn angle associated with the maneuver. In some cases, the processor determines information to be included in the action symbol, such as the exit number or an identification of the side of the road on which an exit occurs. To do so, the processor may use information in the maneuver information, such as exit number 716 or information obtained from the narrative text 717.

The processor associates the determined road symbol and the determined action symbol with the maneuver for presentation (step 550), and presents the determined road symbol and determined action symbol to describe the maneuver (step 560). For example, to do so, the processor may display the road symbol, the action symbol, and, optionally, narrative text for the maneuver in a list of driving directions for a route. The processor also may display the road symbol and the action symbol at an appropriate time in a navigation system, such as when the user of the navigation symbol should be informed of the maneuver.

The processor determines whether there are more maneuvers with which symbols need to be associated (step 570), and, if so, the processor proceeds by selecting another maneuver (step 520). If the processor determines that there are no more maneuvers with which symbols need to be associated, the process 500 ends.

Although FIGS. 1A-7 illustrate systems, methods and techniques for displaying routing symbols for directions in the United States, some implementations may apply the techniques for displaying driving directions to directions for travel outside of the United States.

The techniques also may be applicable, for example, to one or more computing devices for displaying driving directions that communicate in a client system and host system (e.g., an Internet access provider or an Internet service provider) relationship, a single computing device (e.g., with or without networking capabilities), a communication device that includes telephonic capabilities, an embedded system (e.g., a navigation routing system in an automobile or other vehicle), or a mobile navigation system.

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for displaying driving directions, the method comprising:
   accessing data that describes at least one maneuver to be executed to traverse a route from an origin to a destination;
   selecting a portion of the accessed data that describes a particular maneuver, the particular maneuver including an action and a road;
   determining a road symbol to associate with the particular maneuver, the road symbol having substantially the same appearance as a road sign used to mark the road involved in the particular maneuver;
   determining an action symbol to associate with the particular maneuver, the action symbol having substantially the same appearance as a road sign used to identify the action to be performed to execute the particular maneuver; and
   presenting both the road symbol and the action symbol to describe the particular maneuver, such that the road symbol and the action symbol describe the particular maneuver.

2. The method of claim 1 further comprising presenting text, in addition to the road symbol and the action symbol, to describe the particular maneuver.

3. The method of claim 1 wherein presenting both the road symbol and the action symbol comprises presenting only the road symbol and the action symbol to describe the particular maneuver.

4. The method of claim 1 further comprising presenting both the road symbol and the action symbol while travel is occurring.

5. The method of claim 4 wherein a navigation system capable of determining geographic location is used to present the road symbol and the action symbol to describe the particular maneuver.

6. The method of claim 1 wherein a communication device capable of transmitting and receiving voice communications is used to present the road symbol and the action symbol to describe the particular maneuver.

7. The method of claim 1 wherein the action symbol indicates a turn direction involved in the particular maneuver.

8. The method of claim 1 wherein the action symbol indicates a turn angle involved in the particular maneuver.

9. The method of claim 1 wherein the action symbol indicates a merge involved in the particular maneuver.

10. The method of claim 1 wherein the action symbol indicates an exit involved in the particular maneuver.

11. The method of claim 1 wherein the road symbol includes a road number that identifies the road represented by the road symbol.

12. The method of claim 1 wherein the road symbol comprises an interstate road symbol having substantially the same appearance as an interstate sign used to mark the interstate represented by the interstate road symbol.

13. The method of claim 1 wherein presenting the road symbol and the action symbol comprises presenting the road symbol and the action symbol in positions that are adjacent to one another.

14. The method of claim 1, wherein the road symbol and the action symbol describe the particular maneuver without descriptive text.

15. The method of claim 1, wherein the road symbol has substantially the same shape, and coloration, and markings as the road sign used to mark the road involved in the particular maneuver.

16. The method of claim 1, wherein the action symbol has substantially the same shape, coloration, and markings as the road sign used to identify the action to be performed to execute the particular maneuver.

17. An apparatus for displaying driving directions, the apparatus being configured to:
   access data that describes at least one maneuver to be executed to traverse a route from an origin to a destination;
   select a portion of the accessed data that describes a particular maneuver, the maneuver including an action and a road;

determine a road symbol to associate with the particular maneuver, the road symbol having substantially the same appearance as a road sign used to mark the road involved in the particular maneuver;

determine an action symbol to associate with the particular maneuver, the action symbol having substantially the same appearance as a road sign used to identify the action to be performed to execute the particular maneuver; and present both the road symbol and the action symbol to describe the particular maneuver, such that the road symbol and the action symbol describe the particular maneuver.

18. The apparatus of claim 17 further configured to present text, in addition to the road symbol and the action symbol, to describe the particular maneuver.

19. The apparatus of claim 17 further configured to present only the road symbol and the action symbol to describe the particular maneuver.

20. The apparatus of claim 17 further configured to present both the road symbol and the action symbol while travel is occurring.

21. The apparatus of claim 16 comprising a navigation system configured to determine geographic location.

22. The apparatus of claim 17 comprising a communication device configured to transmit and receive voice communications.

23. The apparatus of claim 17 wherein the action symbol indicates a turn direction involved in the particular maneuver.

24. The apparatus of claim 17 wherein the action symbol indicates a turn angle involved in the particular maneuver.

25. The apparatus of claim 17 wherein the action symbol indicates a merge involved in the particular maneuver.

26. The apparatus of claim 17 wherein the action symbol indicates an exit involved in the particular maneuver.

27. The apparatus of claim 17 wherein the road symbol includes a road number that identifies the road represented by the road symbol.

28. The apparatus of claim 17 wherein the road symbol comprises an interstate road symbol that has substantially the same appearance as an interstate sign used to mark the interstate represented by the interstate road symbol.

29. The apparatus of claim 17 further configured to present the road symbol and the action symbol in positions that are adjacent to one another.

30. The apparatus of claim 17, wherein the road symbol and the action symbol describe the particular maneuver without descriptive text.

31. The apparatus of claim 17, wherein the road symbol has substantially the same shape, coloration, and markings as the road sign used to mark the road involved in the particular maneuver.

32. The apparatus of claim 17, wherein the action symbol has substantially the same shape, coloration, and markings as the road sign used to identify the action to be performed to execute the particular maneuver.

33. A system for displaying driving directions, the system comprising:

means for accessing data that describes at least one maneuver to be executed to traverse a route from an origin to a destination;

means for selecting a portion of the accessed data that describes a particular maneuver, the maneuver including an action and a road;

means for determining a road symbol to associate with the particular maneuver, the road symbol having substantially the same appearance as a road sign used to mark the road involved in the particular maneuver;

means for determining an action symbol to associate with the particular maneuver, the action symbol having substantially the same appearance as a road sign used to identify the action to be performed to execute the particular maneuver; and means for presenting both the road symbol and the action symbol to describe the particular maneuver, such that the road symbol and the action symbol are sufficient, without descriptive text, to describe the particular maneuver.

* * * * *